United States Patent [19]

Rupaner et al.

[11] Patent Number: 5,753,746
[45] Date of Patent: May 19, 1998

[54] FORMALDEHYDE-FREE AQUEOUS SYNTHETIC RESIN DISPERSIONS

[75] Inventors: Robert Rupaner, Kronberg; Karl-Heinz Schumacher, Neustadt; Manfred Weber, Mannheim, all of Germany

[73] Assignee: BASF Aktiengesellschaft, Ludwigshafen, Germany

[21] Appl. No.: 806,758

[22] Filed: Mar. 3, 1997

Related U.S. Application Data

[63] Continuation of Ser. No. 636,277, Apr. 29, 1996, abandoned, which is a continuation of Ser. No. 358,018, Dec. 16, 1994, abandoned.

[30] Foreign Application Priority Data

Dec. 23, 1993 [DE] Germany ............... 43 44 149.1

[51] Int. Cl.$^6$ ............................................. B32B 27/00
[52] U.S. Cl. .................. 524/555; 428/254; 428/260; 428/265; 428/267; 428/272; 428/290
[58] Field of Search ................. 428/290, 254, 428/260, 265, 272, 267

[56] References Cited

U.S. PATENT DOCUMENTS

| 3,137,589 | 6/1964 | Reinhard | 117/140 |
|---|---|---|---|
| 4,001,801 | 1/1977 | Moulet | 340/239 |
| 4,107,120 | 8/1978 | Plamondon et al. | 260/29.6 |
| 4,289,676 | 9/1981 | Czauderna et al. | 260/29.6 |
| 4,689,264 | 8/1987 | Fink et al. | 428/290 |
| 4,814,226 | 3/1989 | Goldstein | 428/288 |
| 5,066,715 | 11/1991 | Angel et al. | 524/821 |
| 5,326,814 | 7/1994 | Biale et al. | 524/555 |
| 5,356,683 | 10/1994 | Egolf et al. | 428/60 |
| 5,360,826 | 11/1994 | Egolf et al. | 521/54 |
| 5,369,204 | 11/1994 | Wu et al. | 526/304 |

FOREIGN PATENT DOCUMENTS

| 019 169 | 11/1980 | European Pat. Off. |
| 237 643 | 9/1987 | European Pat. Off. |
| 311 908 | 4/1989 | European Pat. Off. |
| 27 26 806 | 12/1977 | Germany |
| 35 07 154 | 8/1985 | Germany |

OTHER PUBLICATIONS

A. E. Wang et al., J. Coated Fabrics 11 (1982) 208–225.
Vliesstoffe, 2st Ed. p. 57ff, Thieme Verlag 1982.

*Primary Examiner*—Edward J. Cain
*Attorney, Agent, or Firm*—Keil & Weinkauf

[57] ABSTRACT

Formaldehyde-free aqueous synthetic resin dispersions are obtainable by single-stage emulsion polymerization of monomer mixtures containing (A) from 50 to 99% by weight of at least one monomer selected from the group consisting of the acrylic and methacrylic esters of $C_1$–$C_{14}$-alkanols, the vinyl esters of monocarboxylic acids having up to 5 carbon atoms, and styrene (monomer A), (B) from 0.5 to 40% by weight of at least one of the monomers acrylonitrile and methacrylonitrile (monomer B), (C) from 0.5 to 10% by weight of at least one monomer of the general formula I

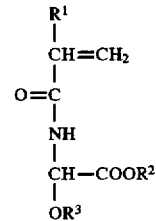

where $R^1$ is hydrogen or methyl and $R^2$ and $R^3$ are each independently of the other hydrogen or $C_1$–$C_4$-alkyl (monomer C), (D) from 0 to 5% by weight of at least one monomer selected from the group consisting of the 3 carbon to 5 carbon α,β-unsaturated mono- and dicarboxylic acids and their amides and anhydrides (monomer D), and (E) from 0 to 3% by weight of at least one further bifunctional monomer (monomer E).

8 Claims, No Drawings

FORMALDEHYDE-FREE AQUEOUS SYNTHETIC RESIN DISPERSIONS

This application is a continuation of application Ser. No. 08/636,277, filed on Apr. 29, 1996, now abandoned, which application is a continuation application Ser. No. 08/358, 018, filed on Dec. 16, 1984, now abandoned.

The present invention relates to formaldehyde-free aqueous synthetic resin dispersions obtainable by single-stage emulsion polymerization of monomer mixtures containing (A) from 55 to 94.5% by weight of at least one monomer selected from the group consisting of the acrylic and methacrylic esters of $C_1$–$C_{14}$-alkanols, the vinyl esters of aliphatic mono-carbozylic acids having up to 5 carbon atoms, and styrene (monomer A), (B) from 0.5 to 40% by weight of at least one of the monomers acrylonitrile and methacrylonitrile (monomer B), (C) from 0.5 to 10% by weight of at least one monomer of the general formula I

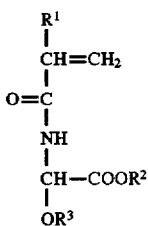

where $R^1$ is hydrogen or methyl and $R^2$ and $R^3$ are each independently of the other hydrogen or $C_1$–$C_4$-alkyl (monomer C), (D) from 0 to 5% by weight of at least one monomer selected from the group consisting of the 3 carbon to 5 carbon $\alpha,\beta$-unsaturated mono- and dicarboxylic acids and their amides and anhydrides (monomer D), and (E) from 0 to 3% by weight of at least one further bifunctional monomer (monomer E).

The present invention further relates to a process for preparing such dispersions, their use as bonding agents for textile sheet materials, and fiber webs produced by means of these dispersions.

Nonwovens, ie. bonded fiber web materials, should generally, as well as a good dry breaking strength, also exhibit adequate strength in the wet state in order that they may withstand for example the mechanical stresses arising in washing processes. The same is true of many applications for the process of drycleaning, where a weak solvent resistance of the bonding agent and a high affinity of the fiber for the solvent can severely reduce the adhesion between fiber and bonding agent and hence also the mechanical properties of the nonwoven during the cleaning process. To confer good wet strength and cleaning agent resistance on nonwovens, it is customary to bond the web using polymer dispersions containing self-crosslinking groups, for example N-methylol groups, (as is known from U.S. Pat. No. 3,137, 589, U.S. Pat. No. 4,001,801, DE-A-2 726 806 or EP-A-0 311 908).

EP-A-0 019 169 discloses bonding, impregnating and coating compositions which are resistant to laundering and drycleaning after heat treatment. They usually contain up to 80% and more of monomers based on butadiene, styrene, acrylonitrile, but frequently also mixtures of (meth)acrylic esters and/or vinyl esters combined with acrylamide-containing monomers. Suitable functionalized amide-containing monomers include the N-methylol derivatives of acrylamide and methacrylamide. They are excellent crosslinking agents for polymers, but inevitably contain a certain proportion of formaldehyde, which is considered toxicologically unsafe and is therefore undesirable in many consumer goods. Formaldehyde is also evolved during the drying of such polymers.

It is further known to prepare such polymers in the form of aqueous polymer dispersions and to use them for consolidating fiber materials such as woven or nonwoven materials, in particular fiber webs. A particular demand exists for bonding and impregnating agents which lead to nonwovens which have adequate mechanical properties not only in the dry but also in the wet and in the solvent-moist state and which are free of formaldehyde or other harmful compounds.

Formaldehyde-free bonding agents having improved wet strength are obtainable according to DE-A-3 507 154 by copolymerizing acrylamidoglycol units with (meth)acrylic esters. The copolymers may also contain monomers such as styrene or (meth)acrylonitrile to obtain a certain glass transition temperature (page 7.7, line 8). The bonding agents obtainable in this way have no resistance whatsoever to organic solvents; the teaching recommends using additional crosslinking substances, such as glyoxal, to achieve this property.

EP-A-0 237 643 likewise describes formaldehyde-free bonding agents for webs, which are based on vinyl acetate/ethylene and which were prepared in the presence of acrylamidoglycol derivatives but which are free of acrylonitrile. They have a distinct lack of resistance to solvents.

The use of acrylonitrile itself is enough to raise the resistance of the polymer to the solvents (cf. A. E. Wang et al., J. Coated Fabrics 11 (1982), 208–225). However, the copolymerization of acrylonitrile also raises the glass transition temperature of such polymers. For instance, butadiene-AN copolymers (NBR) exhibit an increasing hardness of the bonding agent film and a decrease in the solubility in fat, oil and solvents with increasing AN content of the copolymer. Yet a very high AN content and drastic crosslinking (or vulcanization) are required to achieve useful solvent resistances, for example comparable to those of the acrylate bonders. A high proportion of acrylonitrile in the polymer is not desirable, since bonding agents for nonwovens are to lead to very soft, flexible or fluffy materials having an excellent hand. High proportions of acrylonitrile, moreover, confer on the bonding agent film an undesirable yellow tinge and lend webs an unattractive, aged and unclean, "yellowed" appearance. The high appearance and solvent resistance requirements therefore are not achievable with a correspondingly high proportion of acrylonitrile alone. To also achieve the mechanical properties required, moreover, the use of a self-crosslinking system is necessary (cf. Vliesstoffe, 1st edition, p. 57ff, Thieme Verlag 1982).

Furthermore, EP-A-0 392 350 and EP-A-0 311 908 disclose the preparation of bonding dispersions optionally containing acrylonitrile and acrylamidoglycol derivatives. Such bonding agents are heat-sealable—an important property for hygiene articles, such as diapers.

EP-A-0 392 350 describes synthetic resin dispersions composed of vinyl esters, acrylamidoglycolic acid or of a derivative thereof and also, optionally, of a monomer such as acrylonitrile. These synthetic resin dispersions have good washing and cleaning agent resistance and also the property of heat-sealability.

Similarly, EP-A-0 311 908 discloses corresponding polymers, like-wise prepared using vinyl esters, having the capability of heat sealing and the formation of "wash- and cleaning-resistant" bonding agents which, however, are obtained in a more complicated, two-stage procedure.

It is an object of the present invention to find aqueous copolymer dispersions which on use as bonding and impregnating agents for nonwovens confer on these nonwovens good mechanical properties not only in the dry but also in the wet or solvent-moist state and are free of formaldehyde or other harmful compounds. It is a further object of the present invention to find bonding agents for consolidating textile sheet materials which confer textile or wadding-like loft on the latter and preserve their soft, flexible hand without impairing their mechanical or chemical resistance.

We have found that these objects are achieved by the above-defined aqueous synthetic resin dispersions.

The monomers (A) are used in amounts from 50 to 99, preferably from 55 to 94.5, % by weight, particularly preferably from 70 to 80% by weight. Suitable monomers (A) include in particular the acrylic and/or methacrylic esters of $C_1$–$C_{14}$-alkanols, preferably of $C_1$–$C_8$-alkanols. Particular preference is given to acrylic esters such as methyl acrylate, ethyl acrylate, isopropyl acrylate, n-butyl acrylate, isobutyl acrylate or even 2-ethylhexyl acrylate. It is also possible to use the vinyl esters of 3 carbon to 5 carbon saturated monocarboxylic acids such as vinyl acetate or vinyl propionate. Similarly, styrene can make up the whole or part of monomer (A). The preferred mixture of the monomers (A) is chosen so that a polymer composed of these monomers alone would have a glass transition temperature of less than 50°C., preferably less than 30°C. This choice can be made by means of the Fox equation According to Fox (T. G. Fox, Bull. Am. Phys. Soc. (Ser. II) 1, 123 [1956]), the glass transition temperature of copolymers is given to a good approximation by the following equation:

$$\frac{1}{T_g} = \frac{X^1}{T_g^1} + \frac{X^2}{T_g^2} \ldots \frac{X^n}{T_g^n},$$

where $X^1, X^2, \ldots, X^n$ are each the mass fractions of the monomers $1, 2, \ldots, n$ and $T_g^1, T_g^2, \ldots, T_g^n$ are each the glass transition temperatures in Kelvin of the polymers composed in each case only of one of the monomers $1, 2, \ldots$ or n. The glass transition temperatures of these homopolymers of the above-mentioned monomers I, II and IV are known and listed for example in J. Brandrup, E. H. Immergut, Polymer Handbook 1$^{st}$ Ed. J. Wiley, New York 1966 and 2$^{nd}$ Ed. J. Wiley, New York 1975.

Suitable monomers (B), which are used in amounts from 0.5 to 40, preferably from 3 to 30, particularly preferably from 5 to 25, % by weight, are acrylonitrile and/or methacrylonitrile, with acrylonitrile being preferred. Higher proportions of nitrile-containing monomers lead to polymers which have worse film-forming properties and which also harshen the web materials.

Suitable monomers (C) have the general formula I

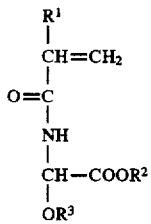

I where $R^1$ is hydrogen or methyl and $R^2$ and $R^3$ are each independently of each other hydrogen or $C_1$–$C_4$-alkyl. Preference is given to those monomers C where $R^2$ has the same meaning as $R^3$, and $R^1$, $R^2$ and $R^3$ are each very particularly preferably hydrogen. The monomers C are used in amounts from 0.5 to 10% by weight, preferably from 1 to 8% by weight, particularly preferably from 2 to 6% by weight.

Acrylamidoglycolic acid ($R^1$, $R^2$ and $R^3$ each being hydrogen) can also be prepared in salt-free form by reacting the corresponding amide in aqueous solution at elevated temperature with a suitable carbonyl compound and be further processed without isolation. To avoid an increase in the final viscosity of the polymer dispersion, the excess of acrylamide is kept to a minimum. The preferred molar reaction ratio of amide to carbonyl derivative is within the range from 1:1 to 1.2:1. This reaction is described for example in EP-B-0 268 424.

Suitable monomers (D), inclusion of which is optional, are 3 carbon to 5 carbon α,β-unsaturated mono- and/or dicarboxylic acids and/or their amides and/or anhydrides, preferably acrylic acid, methacrylic acid, acrylamide, methacrylamide and also maleic acid, fumaric acid and itaconic acid. The monomers D can be included in the copolymerization in amounts of up to 5, preferably up to 3, % by weight.

The copolymerization may also include, as monomers E, bifunctional monomers, which lead to a precrosslinking of the polymer, in amounts of up to 3% by weight. Suitable monomers E include for example bis(meth)acrylates, such as butanediol bisacrylate, polyethylene glycol bisacrylates, polysiloxane bisacrylates, also diolefins such as divinylbenzene, diallyl phthalate or (meth)allyl (meth) acrylates.

The dispersions of the invention can be prepared by any customary method of emulsion polymerization. Preference is given to a semi-continuous process with monomer emulsion addition. The synthetic resin dispersions are advantageously prepared with a solids content of 40–70% by weight. Anionic, nonionic or else cationic emulsifiers or, where appropriate, even mixtures of such compounds can be used. Particular preference for the preparation of the polymer dispersions is given to the well known and widely used emulsifiers such as ethoxylated fatty alcohols or alkylphenols, their alkali metal or ammonium salts of the sulfated, phosphated or sulfonated products; alkyl- or alkylaryl-sulfonates, sulfosuccinic esters or amides or sulfonated alkyl diphenyl oxides. Even higher molecular weight compounds, so-called protective colloids, which can be not only of synthetic but also of natural origin, can be used for stabilizing the polymers, for example polyethylene oxides, block copolymers, starch derivatives, polyvinyl alcohol.

The polymers are obtained by free-radical polymerization. Water-soluble initiators such as the alkali metal persulfates are advantageous for preparing the polymers. It is also possible to use peroxides such as hydrogen peroxide, tert-butyl hydroperoxide, cumene hydroperoxide and others. Preference is given to their use in redox initiator systems where an aqueous solution of a reducing compound is added continuously. Examples of such reducing agents are the alkali metal salts of hydroxymethylsulfinic acid, sodium bisulfite, sodium acetone bisulfite, sodium thiosulfate, ascorbic acid and isoascorbic acid. Redox initiation proceeds particularly smoothly in the presence of small amounts of metal salts capable of easy changes in their valence, for example iron(II) sulfate. The polymerization temperature can be within the range from 5° to 95° C., depending on the initiation system chosen.

Aftertreatment with a further redox system at room temperature or else at a higher temperature makes it possible to raise the conversion considerably and reduce the proportion of residual monomers dramatically. In this way it is possible to obtain polymer dispersions where a conversion of above 99.9 % is achieved as regards monomer B.

To control the molecular weight it is possible, if desired, also to use polymerization regulators. Preferred compounds for this purpose are mercaptans such as alkyl thioglycolates, tert-dodecyl mercaptan, halogen compounds such as tetrabromomethane or else allyl compounds.

In addition, the dispersions of the invention may have added to them additives such as plasticizers, antifoams, pH regulators, flame retardants, water repellents, wetting agents, thickeners, lubricants, antifreezes, pigments, dyes, scents, etc., which are well known to the person skilled in the art, without detriment to the characteristic properties. To additionally catalyze the crosslinking reaction, it is possible to add acids or acid salts. Preference for this purpose is given to sulfuric acid, sodium hydrogensulfate, p-toluenesulfonic acid, ammonium hydrogenphosphate, zinc nitrate or chloride or the corresponding magnesium salts. Generally, however, the presence of the copolymerized acids is sufficient to ensure the crosslinking of the bonding agent at the as-prepared pH.

The dispersions of the invention are highly suitable for use as bonding agents for textile sheet materials. They are formaldehyde-free and, despite the acrylonitrile content of the synthetic resin, contain a very low level of free acrylonitrile.

The textile sheet materials produced according to the invention are notable for enhanced resistance to organic solvents, fats and oils. A typical example of a use is the production of bonded fiber webs based on synthetic fibers, in particular polyester fibers, which are used for producing filling or interlining nonwovens used as filling or reinforcing agents for textile garments or else as furniture cushion. The most important requirement of such materials is the form stability. Thus, their structure, their volume and also their mechanical properties should not change on washing or drycleaning.0

A further field of use are filter materials. The random arrangement of the fibers in the nonwoven leads to better separators for solid particles from flowing media than a regular arrangement. Because their active surface area is significantly larger than that of woven fabrics, nonwovens are highly suitable for air cleaning, industrial dedusting and liquid filtration. Appropriate choice of the fibers, bonding agents and method of production makes it possible to adapt them to the particular requirements, for example as regards the filtration temperature or solvent and chemical resistance. Owing to the high pressure employed in the separating process, high requirements are demanded of the mechanical properties, in particular the strength and extensibility characteristics of the filter materials. Depending on the filter media, they are required to be resistant to fats and oils, for example in the case of milk filters, or to solvents, to lubricants and oils, for example in automotive air filter elements.

A further field of use are disposable protective garments, such as surgical gowns, or clothing protection, for example in paint shops, which has to be resistant to solvents or their vapors.

Suitable web fibers include all the fiber materials customary for nonwoven production. These include not only synthetic fibers such as polyester, polyamide or polypropylene but also fibers of natural origin such as cellulose or viscose.

Nonwoven production is by the commonly known techniques of bath impregnating, foam impregnating, spraying, padding or printing the fiber web with the dispersion, which dispersion is as appropriate diluted with water or else thickened with customary thickeners to adjust it to a certain processing viscosity. The web treatment with the dispersion is generally followed by a drying and heat treatment of the resulting material, in the course of which the crosslinking constituents present in the synthetic polymer of the dispersion react with one another and/or with other functional groups in the polymer of the dispersion and/or with functional groups of the web fibers, maximizing in particular the wet strength of the nonwovens. The drying conditions depend on the nature of the dryer used, customarily the drying temperature is within the range from 100° to 230° C., and the duration of the drying and/or heat treatment step can be within the range from a few seconds to several minutes.

The proportion of fiber to bonder can vary according to the desired use within the range from 1:1 to 50:1 (by weight), for most uses the fiber/bonder ratio is within the range from 2:1 to 10:1.

The dispersions and nonwovens produced in the Examples which follow were assessed by the below-described test methods.

Test methods

Determination of the viscosity of the dispersions

The viscosity of the dispersions was determined at 23° C. in DIN cups and associated rotors using an Epprecht viscometer. The viscosity is reported in mPas.

Determination of the surface tension of the dispersions

The surface tension of the dispersions was determined by means of a ring tensiometer (from Lauda). The reported values in mN/m represent averages of 5 individual measurements at room temperature.

Determination of the light transmissivity (LT)

The light transmissivity is determined on a sample diluted with water to a solids content of 0.01% by weight.

Production of the test nonwovens:

A longitudinally laid (fiber orientation preferentially in one direction, the longitudinal direction) fiber web composed of a mixture of staple viscose fibers and polyester fibers (mixing ratio 30:70) and having a basis weight of 35 g/m$^2$ was impregnated in separate runs with the dispersions of the recited Examples and Comparative Examples which had previously been diluted to a uniform solids content of 25%, brought between two counterrotating rolls to remove excess dispersion, and then exposed to a temperature of 150° C. for 2 min. The bonding agent content of the nonwovens thus obtained was in all cases 29% by weight.

Examinations of the bonded nonwovens:

a) Breaking strength

The nonwovens were cut into 50 mm wide strips and these strips were exposed with a free clamp length of 10 cm in the dry and then the wet state and after impregnating with perchloroethylene to a strip tensile test analogously to DIN 53 857 to determine the breaking strength. The breaking strength was measured (through appropriate cutting-out of the test specimens) longitudinally (1) and transversely (t) to the preferential fiber direction.

b) Bending stiffness

The nonwoven samples were also bent around a metallic mandrel to determine the softness in terms of the bending stiffness. The bending stiffness was taken to be the force which was necessary for the bending. This force was measured longitudinally and transversely to the preferential fiber direction. Emulsifiers used:

| | |
|---|---|
| Emulsifier 1: | 30% strength by weight aqueous solution of a neutralized, sulfated fatty alcohol ethoxylate; Disponil FES 77 ® from Henkel AG |
| Emulsifier 2: | 20% strength by weight aqueous solution of an ethoxylated tallow fat alcohol (Emulan OG ® from BASF AG) |
| Emulsifier 3: | 40% strength by weight solution of a mixture of neutralized C12 and C14 fatty alcohol sulfate |
| Emulsifier 4: | 45% strength by weight solution of a neutralized alkyl diphenyl oxide sulfonate; Dowfax 2A1 ® from Dow Chem. |
| Emulsifier 5: | 50% strength by weight solution of a neutralized sulfosuccinic ester; Lumiten IRA ® from BASF AG |

Abbreviations:

| | |
|---|---|
| AAG | Acrylamidoglycolic acid |
| MAGME | Dimethyl acrylamidoglycolate |
| EA | Ethyl acrylate |
| BA | n-Butyl acrylate |
| AS | Acrylic acid |
| AN | Acrylonitrile |
| EHA | Ethyl hexyl acrylate |
| MA | Methyl acrylate |
| MMA | Methyl methacrylate |
| VPr | Vinyl propionate |
| S | Styrene |
| AMol | N-Methylolacrylamide |
| NaPS | Sodium persulfate |

EXAMPLE 1

Dispersion 1.1:

A mixture of 566 g of water and 45 g of a monomer emulsion D1.1 was heated to 85° C. and on reaching an internal temperature of 70° C. admixed all at once with 5% of a solution of 7.5 g of sodium peroxodisulfate in 200 g of water. After 15 min a start was made, while maintaining the polymerization temperature, to continuously add the remainder of the monomer emulsion D1.1 over 120 min and the remainder of the initiator solution over 135 min. On completion of the addition the batch was held at that temperature for a further 60 min. After cooling down to room temperature it was admixed in each case with 0.2%, based on the monomer mass, of an aqueous solution of t-butyl hydroperoxide and ascorbic acid and a mixture of 15 g of emulsifier I and 322.5 g of emulsifier II was added. A coagulum-free dispersion having a solids content of 49% by weight was obtained. The free acrylonitrile content is <10 ppm (determined by gas chromatography).

Composition of D1.1:

| | |
|---|---|
| 450 g [30%]* | of n-butylacrylate |
| 682.5 g [45.5%] | of ethylacrylate |
| 300 g [20%] | of acrylonitrile |
| 52.5 g [3.5%] | of acrylamidoglycolic acid |
| 15 g [1.0%] | of acrylic acid |
| 3 g | of sodium acetate |
| 75 g | of emulsifier 1 |
| 112.5 g | of emulsifier 2 |
| 580 g | of water |

*The percentages in parentheses are based on the pure monomer composition.

EXAMPLES 1.2–1.8

The following Examples 1.2 to 1.8 were prepared in the same way as 1.1. They differ merely in the monomer composition.

TABLE 1

| Ex. | EA | BA | AN | AAG | AS | % NaPS * | pH | LT [%] | v [mN/m] | η [mPa/s] |
|---|---|---|---|---|---|---|---|---|---|---|
| 1.1 | 45.5 | 30 | 20 | 3.5 | 1 | 0.5 | 3.2 | 56 | 39.5 | 19 |
| 1.2 | 35.5 | 40 | 20 | 3.5 | 1 | 0.5 | 2.4 | 59 | 39.0 | 18 |
| 1.3 | 25.5 | 50 | 20 | 3.5 | 1 | 0.5 | 2.5 | 56 | 39.3 | 18 |
| 1.4 | 50.5 | 30 | 15 | 3.5 | 1 | 0.5 | 3.2 | 58 | 38.8 | 17 |
| 1.5 | — | 75.5 | 20 | 3.5 | 1 | 0.5 | 2.3 | 48 | 41 | 36 |
| 1.6 | — | 75.5 | 20 | 3.5 | 1 | 0.1 | 2.5 | 51 | 41.6 | 31 |

*% by weight of total monomer

EXAMPLE 2

Dispersion 2.1

A mixture of 560 g of water, 2.5 g of emulsifier 1, 10.0 g of 30% strength by weight hydrogen peroxide and 45.0 g of a monomer emulsion D2.1 was heated to 60° C. and on reaching an internal temperature of 50° C. admixed all at once with 5% of a reducing solution of 3.0 g of ascorbic acid and 15 mg of iron(II) sulfate in 200 g of water. After 15 min a start was made, while maintaining the polymerization temperature, to continuously add the remainder of the monomer emulsion D2.1 over 120 min and the remainder of the reducing solution over 135 min. On completion of the addition the batch was held at that temperature for a further 60 min. After cooling down to room temperature 0.2% by weight, based on the monomer quantity, was added in each case of a respectively 10% strength by weight aqueous solution of t-butyl hydroperoxide and ascorbic acid.

Composition of D2.1

| | |
|---|---|
| 450 g [30%]* | of n-butyl acrylate |
| 682.5 g [45.5%] | of ethylacrylate |
| 300 g [20%] | of acrylonitrile |
| 52.5 g [3.5%] | of acrylamidoglycolic acid |
| 15 g [1.0%] | of acrylic acid |
| 72.5 g | of emulsifier 1 |
| 37.5 g | of emulsifier 2 |
| 640 g | of water |

EXAMPLES 2.2–2.4

The following Examples 2.2 to 2.4 were prepared in the same way as 2.1. They differ merely in the monomer composition (cf. Tab. 2). The numerical data for the monomers are % by weight of the total monomer, which corresponds to that of D2.1.

TABLE 2

| Ex. | EA | BA | EHA | AN | AAG | AS | pH | LT [%] | v [mN/m] | η [mPa/s] |
|---|---|---|---|---|---|---|---|---|---|---|
| 2.1 | 45.5 | 30 | — | 20 | 3.5 | 1 | 2.2 | 81 | — | 67 |
| 2.2 | 65.5 | — | 10 | 20 | 3.5 | 1 | 2.3 | 82 | 47.7 | 63 |
| 2.3 | 75.5 | — | — | 20 | 3.5 | 1 | 2.4 | 73 | 42.8 | 41 |
| 2.4 | 65.5 | — | — | 30 | 3.5 | 1 | 2.3 | 77 | 41.6 | 37 |

EXAMPLE 3

Dispersions 3.1–3.7, 3.9, 3.10

The preparation was effected as in the case of dispersion 1.1, except that the initiator solution used was a solution of 3.0 g of sodium persulfate in 200 ml of water (0.2% based on total monomer mass).

TABLE 3

| Ex. | BA | EA | VPr | AN | AAG | MAG ME | BDA | AS | pH | LT [%] | η [mPas] |
|---|---|---|---|---|---|---|---|---|---|---|---|
| 3.1 | 76 | — | — | 20 | 3.0 | — | — | 1 | 2.4 | 56 | 24 |
| 3.2 | 75.5 | — | — | 20 | 3.5 | — | — | 1 | 2.5 | 51 | 38 |
| 3.3 | 75 | — | — | 20 | 4.0 | — | — | 1 | 2.1 | 56 | 98 |
| 3.4 | 74.5 | — | — | 20 | 4.5 | — | — | 1 | 2.1 | 54 | 211 |
| 3.5 | 75.3 | — | — | 20 | 3.5 | — | 0,2 | 1 | 2.3 | 51 | 39 |
| 3.6 | 75 | — | — | 20 | — | 4 | — | 1 | 3.1 | 55 | 18 |
| 3.7 | 79 | — | — | 16 | 4* | — | — | 1 | 2.1 | 48 | 340 |
| 3.8 | 79.5 | — | — | 16 | 3.5 | — | — | 1 | 2.0 | 48 | 74 |
| 3.9 | — | 47.7 | 30 | 20 | 2.5 | — | — | — | 2.7 | 58 | 17 |
| 3.10 | — | 45.5 | 30 | 20 | 2.5** | — | — | — | 2.7 | 62 | 26 |

*obtained by reaction of AM and glyoxylic acid.
**additionally contains 2% of acrylamide Pertaining to Example 3.8.

66.4 g of a 50% strength by weight aqueous solution of glyoxylic acid and 73.6 g of a likewise 50% strength by weight aqueous solution of acrylamide are maintained with stirring at 60° C. for 4 hours, then cooled down and diluted with 560 g of water to form a water-viscous, slightly yellowish solution. pH=1.4. 600 g of solution are used for preparing the monomer emulsion instead of the acrylamidoglycolic acid.

EXAMPLE 4

Dispersions 4.1–4.3

The preparation was effected analogously to Example 3.2, except with the use of the monomer emulsions D4.1 to D4.3.

Composition of D4.1

| | |
|---|---|
| 1132 g [75,5%] | of n-butyl acrylate |
| 300 g [20%] | of acrylonitrile |
| 52.5 g [3.5%] | of acrylamidoglycolic acid |
| 15.0 g [1.0%] | of acrylic acid |
| 15.0 g | of emulsifier 3 |
| 1.5 g | of sodium pyrophosphate |
| 660 g | of water |

Composition of D4.2

| | |
|---|---|
| 1132 g [75.5%] | of n-butyl acrylate |
| 300 g [20%] | of acrylonitrile |
| 52.5 g [3.5%] | of acrylamidoglycolic acid |
| 15 g [1.0%] | of acrylic acid |
| 40 g | of emulsifier 4 |
| 1.5 g | of sodium pyrophosphate |
| 686 g | of water |

Composition of D4.3

| | |
|---|---|
| 1132 g [75.5%] | of n-butyl acrylate |
| 300 g [20%] | of acrylonitrile |
| 52.5 g [3.5%] | of acrylamidoglycolic acid |
| 15 g [1.0%] | of acrylic acid |
| 37.5 g | of emulsifier 5 |
| 112 g | of emulsifier 2 |
| 1.5 g | of sodium pyrophosphate |
| 630 g | of water |

TABLE 4

| Ex. | BA | AN | AAG | AS | pH | LT [%] | η [mPas] |
|---|---|---|---|---|---|---|---|
| 4.1 | 75.5 | 20 | 3.5 | 1 | 2.4 | 16 | 54 |
| 4.2 | 75.5 | 20 | 3.5 | 1 | 2.2 | 40 | 17 |
| 4.3 | 75.5 | 20 | 3.5 | 1 | 2.4 | 50 | 88 |

EXAMPLE 5

Swelling values in various solvents

Example 1.1 was followed to prepare dispersions 5a–f. The dispersions were made to form films at 25° C. and 80% relative humidity and the films were held at 150° C. for 10 min and investigated in respect of their swellability in various solvents.

TABLE 5

| | Composition | | | | | Tg* [°C.] | Swelling values (solvent uptake) in % | | | | | | |
|---|---|---|---|---|---|---|---|---|---|---|---|---|---|
| | | | | | | | H₂O 24 h | Toluene 2 h | THF 2 h | Acetone 2 h | CH₂Cl₂ 2 h | PET*** 24 h, 40° | Oil*** 24 h, 40° |
| Ex. | EA | BA | AN | AAG | AS | | | | | | | | |
| 5a | 75.5 | — | 20 | 3.5 | 1 | 23 | 128 | 250 | 3400 | 3000 | 4100 | 2040 | 104 |
| 5b | 95.5 | — | — | 3.5 | 1 | −11 | 153 | 790 | 1040 | 810 | 1640 | 1170 | 104 |
| 5c | 79 | — | 20 | — | 1 | | 112 | —* | —* | —* | —* | —* | 103 |
| 5d | — | 75.5 | 20 | 3.5 | 1 | −3 | 128 | 700 | 1560 | 1030 | 1880 | 1380 | 104 |
| 5e | — | 95.5 | — | 3.5 | 1 | −44 | 712 | 900 | 970 | 610 | 1320 | 900 | 132 |
| 5f | — | 79 | 20 | — | 1 | | 114 | —* | —* | —* | —* | —* | 104 |

Tg = glass transition temperature determined by DSC
*film dissolves
**diethyl phthalate
***commercial salad oil (thistle)

EXAMPLE 6
Comparative experiments
Comparative Experiment C6.1

Example 2 was repeated with a monomer mixture of the composition: 70.5% by weight of ethyl acrylate, 26% by weight of methyl acrylate, 2.5% by weight of N-methylolacrylamide and 1% by weight of acrylic acid.
Comparative Experiment C6.2:

Example 2 was repeated with a monomer mixture of the composition: 70% by weight of ethyl acrylate, 26% by weight of methyl acrylate, 3% by weight of acrylamidoglycolic acid and 1% by weight of acrylic acid.

Comparative Experiment C6.3:

Example 2 was repeated without acrylonitrile, using a monomer mixture of the composition: 95.5% by weight of ethyl acrylate, 3.5% by weight of acrylamidoglycolic acid and 1% by weight of acrylic acid.

Comparative Experiment C6.4:

Example 3 was repeated without acrylamidoglycolic acid, using an emulsion having the monomer composition of 79% by weight of butyl acrylate, 20% by weight of acrylonitrile and 1% by weight of acrylic acid.

Comparative Experiment C6.5:
Ex. 2 of EP 302 588

Comparative Experiment C6.6:
Ex. 4 of EP 19 169

Comparative Experiment C6.7

Example 3 was repeated without acrylamidoglycolic acid, using an emulsion with a monomer composition of 75.5% by weight of butyl acrylate, 20% by weight of styrene, 3.5% by weight of acrylamidoglycolic acid and 1% by weight of acrylic acid.

Comparative Experiment C6.8

Example 3 was repeated without acrylonitrile, using the following monomer composition: 50% by weight of vinyl propionate, 47.5% by weight of ethyl acrylate, 2.5% by weight of acrylamidoglycolic acid, the solids content was 48% by weight.
Comparative Experiment C6.9

Example 3 was repeated except that, in a 40% strength by weight polymer dispersion, methyl methacrylate was used in place of acrylonitrile as hardening monomer.

TABLE 6

| Comparative Example | EA | BA | MA | MMA | AN | S | VPr | AAG | AMOL | MAG ME | AS | pH | LT [%] | η [mPas] |
|---|---|---|---|---|---|---|---|---|---|---|---|---|---|---|
| C6.1 | 70.5 | — | 26 | — | — | — | — | — | 2.5 | — | 1 | 2.1 | 68 | 15 |
| C6.2 | 70 | — | 26 | — | — | — | — | 3 | — | — | 1 | 1.8 | 63 | 26 |
| C6.3 | 95.5 | — | — | — | — | — | — | 3.5 | — | — | 1 | 1.9 | 81 | 88 |
| C6.4 | — | 79 | — | — | 20 | — | — | — | — | — | 1 | 4.2 | 55 | 15 |
| C6.5 | — | 52 | — | 39 | — | — | — | — | — | 8 | 1 | 2.1 | 69 | 43 |
| C6.6 | 95.5 | — | — | — | — | — | — | 3.5 | — | — | 1 | 1.5 | 57 | 7 |
| C6.7 | — | 75.5 | — | — | — | 20 | — | 3.5 | — | — | 1 | 2.0 | 39 | 86 |
| C6.8 | 47.5 | — | — | — | — | — | 50 | 2.5 | — | — | — | 3.1 | 60 | 19 |
| C6.9 | — | 77.5 | — | 18 | — | — | — | 3.5 | — | — | 1 | 1.9 | 59 | 10 |

EXAMPLE 7
Nonwoven testing and results

TABLE 7

| Polymer of Ex. No | Strip tensile tests | | | | | | Bending stiffness | |
|---|---|---|---|---|---|---|---|---|
| | dry | | wet | | perc-moist | | | |
| | l | t | l | t | l | t | l | t |
| 1.1 | 65 | 52 | 37 | 32 | 24 | 18 | 67 | 56 |
| 1.2 | 65 | 48 | 36 | 29 | 23 | 17 | 46 | 46 |
| 1.3 | 67 | 49 | 32 | 25 | 22 | 15 | 79 | 27 |
| 1.4 | 61 | 53 | 31 | 25 | 17 | 11 | 52 | 40 |
| 1.5 | 57 | 46 | 25 | 17 | 19 | 14 | 39 | 32 |
| 1.6 | 58 | 44 | 27 | 23 | 25 | 19 | 42 | 33 |
| 2.1 | 69 | 55 | 53 | 39 | 30 | 19 | 56 | 42 |
| 2.2 | 81 | 32 | 53 | 15 | 29 | 11 | 80 | 52 |
| 2.3 | 80 | 34 | 49 | 16 | 30 | 13 | 117 | 80 |
| 2.4 | 64 | 28 | 46 | 13 | 43 | 18 | 227 | 155 |
| 3.1 | 66 | 45 | 28 | 25 | 22 | 15 | 38 | 28 |
| 3.2 | 69 | 48 | 26 | 20 | 22 | 18 | 37 | 22 |
| 3.3 | 69 | 50 | 31 | 23 | 23 | 16 | 43 | 34 |
| 3.4 | 68 | 48 | 31 | 23 | 25 | 16 | 52 | 33 |
| 3.5 | 67 | 44 | 27 | 23 | 23 | 16 | 54 | 36 |

TABLE 7-continued

| Polymer of Ex. No | Strip tensile tests | | | | | | Bending stiffness | |
|---|---|---|---|---|---|---|---|---|
| | dry | | wet | | perc-moist | | | |
| | l | t | l | t | l | t | l | t |
| 3.6 | 75 | 45 | 38 | 23 | 21 | 12 | 36 | 23 |
| 3.7 | 73 | 47 | 34 | 26 | 19 | 15 | 38 | 24 |
| 3.8 | 60 | 44 | 26 | 18 | 17 | 11 | 37 | 24 |
| 3.9 | 71 | 46 | 42 | 36 | 23 | 18 | 98 | 55 |
| 3.10 | 74 | 47 | 40 | 33 | 28 | 25 | 110 | 64 |
| 4.1 | 70 | 44 | 43 | 26 | 29 | 14 | 66 | 43 |
| 4.2 | 69 | 46 | 31 | 22 | 25 | 15 | 32 | 25 |
| 4.3 | 77 | 50 | 44 | 30 | 26 | 16 | 43 | 25 |
| C6.1 | 62 | 41 | 46 | 29 | 21 | 10 | 31 | 22 |
| C6.2 | 73 | 50 | 43 | 25 | 12 | 5 | 30 | 18 |
| C6.3 | 77 | 55 | 45 | 32 | 8 | 4 | 25 | 18 |
| C6.4 | 64 | 46 | 21 | 16 | 9 | 9 | 26 | 15 |
| C6.5 | 79 | 44 | 53 | 33 | 15 | 7 | 63 | 48 |
| C6.6 | 52 | 36 | 32 | 22 | 7 | 4 | 32 | 21 |
| C6.7 | 70 | 33 | 40 | 17 | 6 | 2 | 31 | 13 |
| C6.8 | 77 | 51 | 39 | 28 | 4 | 2 | 28 | 18 |
| C6.9 | 59 | 30 | 44 | 19 | 7 | 2 | 26 | 18 |

We claim:

1. A process for bonding textile fiber materials and imparting effective mechanical properties to the textile fiber materials when existing in dry, or water-wet, or organic solvent-moist states, which process comprises treating the textile fiber materials with a formaldehyde-free resistant aqueous synthetic resin dispersion to which no external crosslinking agent has been added, the formaldehyde-free aqueous synthetic resin dispersion obtained by the single-stage emulsion polymerization of self-crosslinking monomer mixtures consisting essentially of:

(A) from 55 to 94.5% by weight of at least one monomer selected from the group consisting of the acrylic and methacrylic esters of $C_1$–$C_{14}$-alkanols, the vinyl esters of saturated monocarboxylic acids having up to 5 carbon atoms, and styrene (monomer A);

(B) from 3 to 30% by weight of at least one of the monomers acrylonitrile and methacrylonitrile (monomer B);

(C) from 0.5 to 10% by weight of at least one monomer of the RUPANER et al., Ser. No. 08/636,277 formula I

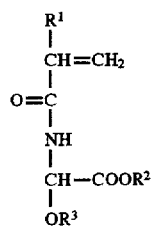

where $R^1$ is hydrogen or methyl and $R^2$ and $R^3$ are each independently of the other hydrogen or $C_1$–$C_4$-alkyl (monomer C);

(D) from 0 to 5% by weight of at least one monomer selected from the group consisting of the 3 carbon to 5 carbon α,β-unsaturated mono- and dicarboxylic acids and their amides and anhydrides (monomer D); and (E) from 0 to 3% by weight of at least one further bifunctional monomer (monomer E).

2. The dispersion as claimed in claim 1, wherein (B) is from 5 to 40% by weight of at least one of the monomers acrylonitrile and methacrylonitrile (monomer B).

3. The dispersion as claimed in claim 1, wherein (B) is from 3 to 30% by weight of at least one of the monomers acrylonitrile and methacrylonitrile (monomer B).

4. The process of claim 1, wherein monomer C is acrylamidoglycolic acid.

5. The process of claim 4, wherein monomer C is a reaction product of acrylamide and glyoxylic acid.

6. The process of claim 1, which additionally comprises aftertreating aqueous polymer obtained from the single-stage emulsion polymerization of the self-crosslinking monomer mixtures with a redox initiator system.

7. The process of claim 1, wherein monomer B is present in an amount sufficient to provide from 5 to 25% by weight.

8. A bonded textile fiber material prepared by the process of claim 1, which bonded textile fiber material has effective mechanical properties when existing in dry, or water-wet, or organic solvent-moist states.

* * * * *

UNITED STATES PATENT AND TRADEMARK OFFICE
CERTIFICATE OF CORRECTION

PATENT NO.: 5,753,746

DATED: May 19, 1998

INVENTOR(S): RUPANER et al.

It is certified that error appears in the above-identified patent and that said Letters Patent is hereby corrected as shown below:

Col. 13, claim 1, line 5, insert --solvent-- before "resistant".

Signed and Sealed this

Twenty-second Day of September, 1998

Attest:

BRUCE LEHMAN

*Attesting Officer*          *Commissioner of Patents and Trademarks*